(12) United States Patent
Lichvar

(10) Patent No.: US 6,247,869 B1
(45) Date of Patent: Jun. 19, 2001

(54) TUBING CONNECTOR

(75) Inventor: Jerry L. Lichvar, Grants Pass, OR (US)

(73) Assignee: Ultra Lite Products, Inc., Grants Pass, OR (US)

( * ) Notice: Subject to any disclaimer, the term of this patent is extended or adjusted under 35 U.S.C. 154(b) by 0 days.

(21) Appl. No.: 09/183,218

(22) Filed: Oct. 29, 1998

Related U.S. Application Data
(60) Provisional application No. 60/064,519, filed on Nov. 5, 1997.

(51) Int. Cl.[7] ............................. F16L 41/00; F16L 43/00
(52) U.S. Cl. .................. 403/205; 285/179.1; 52/655.1; 403/169; 403/403
(58) Field of Search .................................... 403/205, 169, 403/170, 171, 180, 403, 382, 400, 174, 231; 52/656.9, 655.1; 285/179, 179.1, 179.2

(56) References Cited

U.S. PATENT DOCUMENTS

| | | | |
|---|---|---|---|
| 413,730 | * | 10/1889 | Palmer . |
| 998,904 | * | 7/1911 | Jacobs ................................. 403/174 |
| 1,770,852 | * | 7/1930 | Hill . |
| 1,859,972 | * | 5/1932 | Key .................................. 285/179.1 |
| 1,957,362 | * | 5/1934 | Smith . |
| 2,955,851 | * | 10/1960 | Scott ................................ 285/179.1 |
| 3,353,854 | * | 11/1967 | Hansen . |
| 5,676,404 | * | 10/1997 | Sisk .................................. 285/179.1 |

* cited by examiner

*Primary Examiner*—Lynne H. Browne
*Assistant Examiner*—Tomlyne A Malcolm
(74) *Attorney, Agent, or Firm*—Klarquist Sparkman Campbell Leigh & Whinston, LLP

(57) ABSTRACT

A tubing connector adapted to receive portions of a plurality of elongate substantially rigid tubes and to hold them in a defined angular relationship relative to each other. The connector has a body with a plurality of tube-receiving and holding apertures formed therein. Stop elements in the apertures spaced inwardly from the mouths of the apertures limit the extent to which end portions of tubes may be inserted longitudinally into the body.

20 Claims, 5 Drawing Sheets

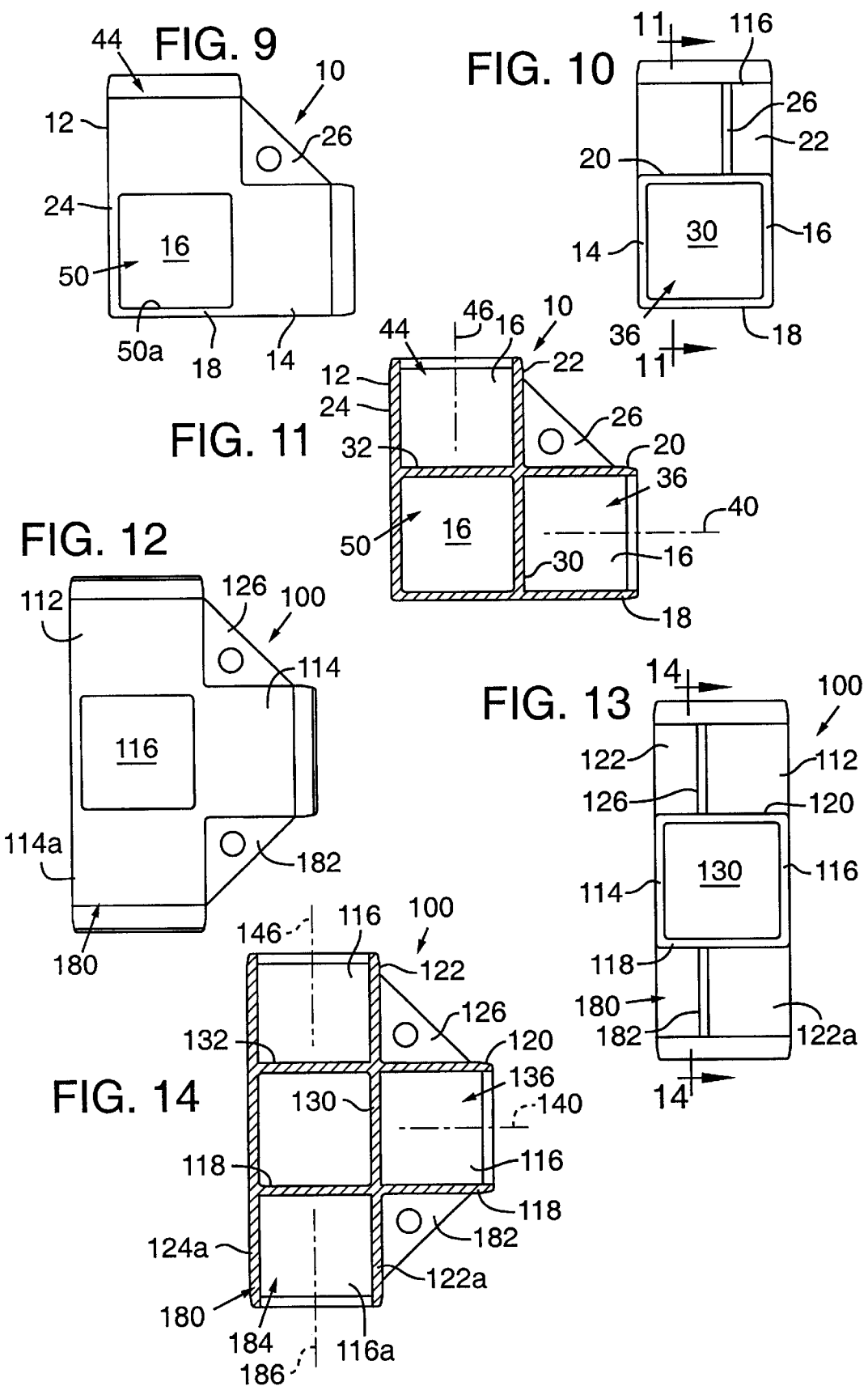

TUBING CONNECTOR

This application claims the benefit of U.S. Provisional Application No. 60/064,519, Nov. 5, 1997.

FIELD OF THE INVENTION

This invention relates to a device for receiving adjacent ends of a plurality of substantially rigid tubes and holding them in defined angular relationships.

BACKGROUND OF THE INVENTION

Substantially rigid tubing, or pipe, such as PVC tubing is used for constructing frames of many styles. In the past there have been few, if any, acceptable connectors to permit interconnecting adjacent ends of plural tubes to hold them in desired defined angular relationships. Depending upon the strength of the tubing used, frames made of such materials could be used for various material supports, such as for supporting frames, crating or caging frame works, load support structures, etc.

Various round pipe angle connectors had been available for connecting ends of substantially rigid round tubing, but these generally have been fully open inside with little to support and limit the depth of insertion of a tube and also have generally been only for round pipe. Further they generally have provided no stop, or limit, elements which would support a rather substantial load imposed axially upon the tube.

SUMMARY OF THE INVENTION

The present invention provides a tubing connector adapted to receive the ends of a plurality of elongate substantially rigid tubes, which may be multi-angular, or polygonal, in cross-sectional configuration and to hold them in a defined angular relationship. The tubing connector has passages, or apertures, formed therein, each adapted to receive and hold an end of one tube which is offset from other tubes connected thereto, and a stop, or limit, element in the aperture spaced inwardly of the body from the mouth of its associated aperture to limit the extent to which a tube is inserted longitudinally and to support the tube against further movement into the body of the connector.

More specifically the tubing connector of the present invention provides a plurality of apertures, each having a central axis which is angularly disposed relative to the axes of other apertures, permitting the construction of a space frame with tubes inserted into such apertures.

Another object of the present invention is to provide such a tubing connector in which the tube-receiving apertures are polygonal in cross-section and are configured to closely and slidingly receive an end of a tube, with the tube held therein by a friction fit.

These and other objects and advantages will become more fully apparent as the following description is read in conjunction with the drawings.

BRIEF DESCRIPTION OF THE DRAWINGS

FIG. 9 is a side elevation view of the three-aperture tubing connector of FIG. 1;

FIG. 10 is an end elevation of the three-aperture connector of FIG. 1;

FIG. 11 is a cross-sectional view taken generally along the line 11—11 in FIG. 10;

FIG. 12 is a side elevation view of the four-aperture connector of FIG. 5;

FIG. 13 is an end elevation view of the four-aperture connector of FIG. 5; and

FIG. 14 is a cross-sectional view taken generally along the line 14—14 in FIG. 13.

DETAILED DESCRIPTION OF ILLUSTRATED EMBODIMENTS

Figure 1:
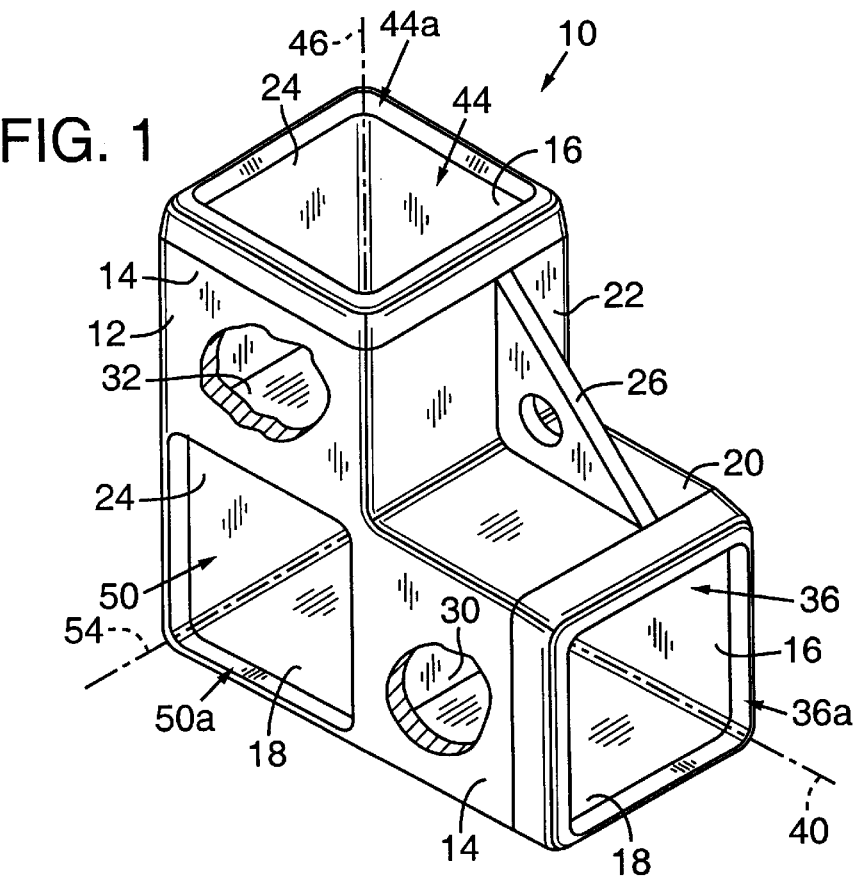
FIG. 1 is a perspective view of the top and one side of a three-aperture tubing connector constructed according to an embodiment of the invention, with portions broken away.
Figure 2:
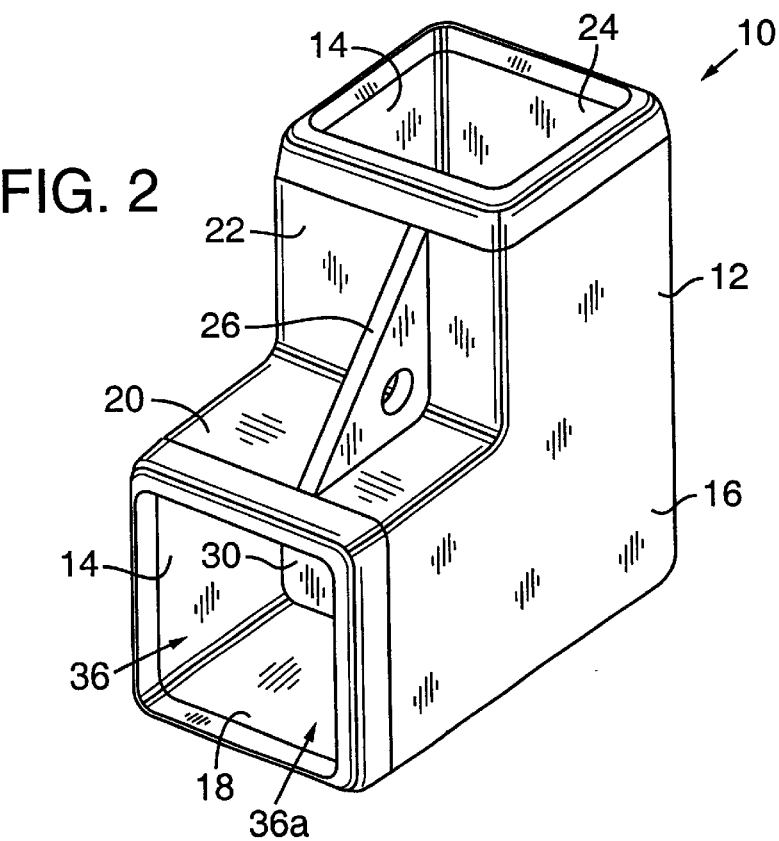
FIG. 2 is a perspective view of the top and opposite side of the tubing connector of FIG. 1.

Referring to the drawings, and first more specifically to FIGS. 1, 2, and 9–11, at 10 is indicated generally a tubing connector constructed according to an embodiment of the invention. The connector comprises a monolithic, or integral, body 12 which may be molded or otherwise formed from a suitable rigid plastic material, such as ABS, or any other substantially rigid material, such as aluminum or other appropriate metals, which will maintain its shape to hold tubing in a defined angular relationship as will be described below.

Body 12 is substantially block shaped having opposed, spaced apart, substantially parallel, upright sidewalls, or sides, 14, 16, a bottom wall, or side, 18, a top wall, or side, 20, and a pair of opposed, spaced apart, substantially parallel upright walls, or sides, 22, 24.

A triangularly shaped gusset, or flange, 26 extends between and has opposite edges secured to walls 20, 22 to provide additional rigidity to the structure. It will be noted that the gusset in the illustrated embodiment is offset toward a side wall from a vertical center plane of the connector (i.e., closer to the plane of sidewall 16 than to the plane of sidewall 14), although it could be on the center plane. The purpose for the offset is that the connector may be laid on its side with the gusset substantially horizontal. Space frames formed with the connectors positioned so the gussets are horizontal provide, at corner regions, horizontally disposed side portions of the gussets which may act as supports for other products, such as panels to be laid thereon. For example, if the space frame is to be used to make a table or other type of product with a planer inlaid panel, a corner of the panel may rest on the side of a gusset. The spacing of the side of the gusset from a parallel side wall of the tubing connector can provide a flush mounting for the top of the panel with the side wall of the tubing connector. The thickness of a panel to be inlaid would determine the distance which the gusset is inset from a side wall.

It will be noted also that the gussets have holes extending therethrough. This permits fasteners, such as screws, to be inserted therethrough to hold a panel thereon, or permits stabilizing wires or other devices to be attached to extend within the frame work produced by the tubing connectors and tubes which will be connected thereto. For example, guy wires can be attached to diagonally opposed gussets and drawn taut to stabilize a space frame produced thereby.

As is seen in FIG. 11 and the broken away portions of FIG. 1, an upright internal wall 30, extends vertically between floor 18 and top wall 20 and fully from side-to-side between sidewalls 14 and 16. Wall 30 is substantially aligned vertically with wall 22. Another internal wall 32 aligned with wall 20 extends between walls 22, 24 and side walls 14, 16.

The interior surfaces of walls 14, 16, 18 and 20 define a tube-receiving aperture 36, also referred to herein as a passage, bore, tunnel, or opening. The mouth of bore 36, also referred to herein as an opening, or orifice, is indicated generally at 36a. Aperture 36 extends inwardly from mouth 36a to terminate at wall 30.

Aperture 36 is multi-angular in cross-section having a polygonal configuration, which here is rectangular or square. The central axis for aperture 36 is indicated generally by line 40. The aperture cross-section may be varied as needed to be complementary to the configuration of tubing with which it may be used. For example, if the tubing has a hexagonal cross-section the tubing connector apertures would be formed with hexagonal cross-section.

Walls 14, 16, 22, and 24 define a second aperture 44 having a tube-receiving mouth 44a. Aperture 44 extends inwardly from mouth 44a to terminate at wall 32. The inner surfaces of walls 14, 16, 22 and 24 again form a tube-receiving aperture 44 which has a multi-angular polygonal cross-section, which here is rectangular or square also. The central axis of aperture 44 is indicated by line 46.

A third tube-receiving aperture 50 having a mouth 50a extends inwardly of the body from wall 14 and terminates at opposing wall 16. Tube receiving aperture 50 is defined by opposed walls 18, 32 and opposed walls 24, 30. Again the aperture has a multi-angular polygonal cross-section, which here is substantially rectangular or square. The central axis for aperture 50 is indicated generally by line 54.

As is seen in the Figures, a plane occupied by central axes 40 and 46 of apertures 36 and 44, respectively, substantially bisects the length of aperture 50. This illustrates how aperture 50 is recessed into body 12 between side member, or walls, 14, 16 with its mouth opening through side wall 14. This further illustrates how apertures 36, 44, and 50 occupy a generally common plane between side walls, or members, 14, 16 to provide a compact substantially rigid structure.

The structure may be seen as having a central body portion, the walls of which define aperture 50, with protrusions extending at different angles outwardly therefrom which define apertures 36, 44. The inner surfaces of the sides forming the mouths of the apertures are slightly chamfered to facilitate entry of a tube as will be discussed below.

Figure 3:
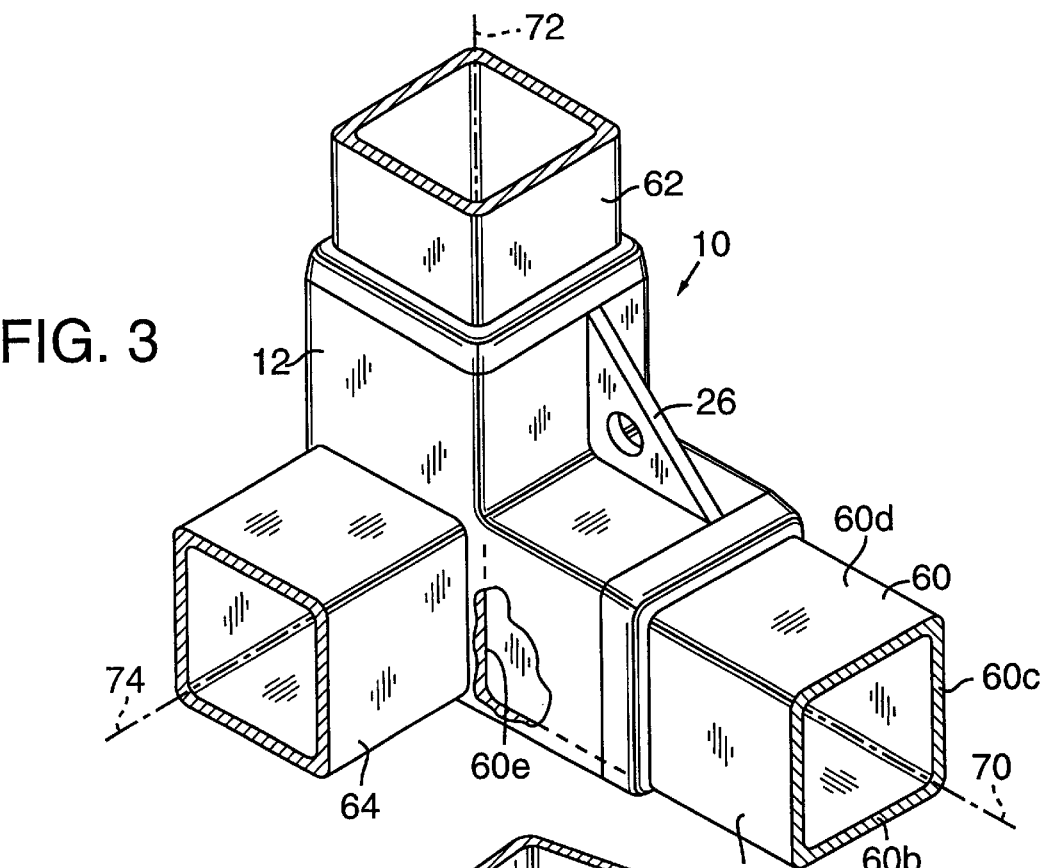
FIG. 3 is a view similar to FIG. 1, but with a plurality of tubes inserted into the three apertures and with a portion broken away.
Figure 4:
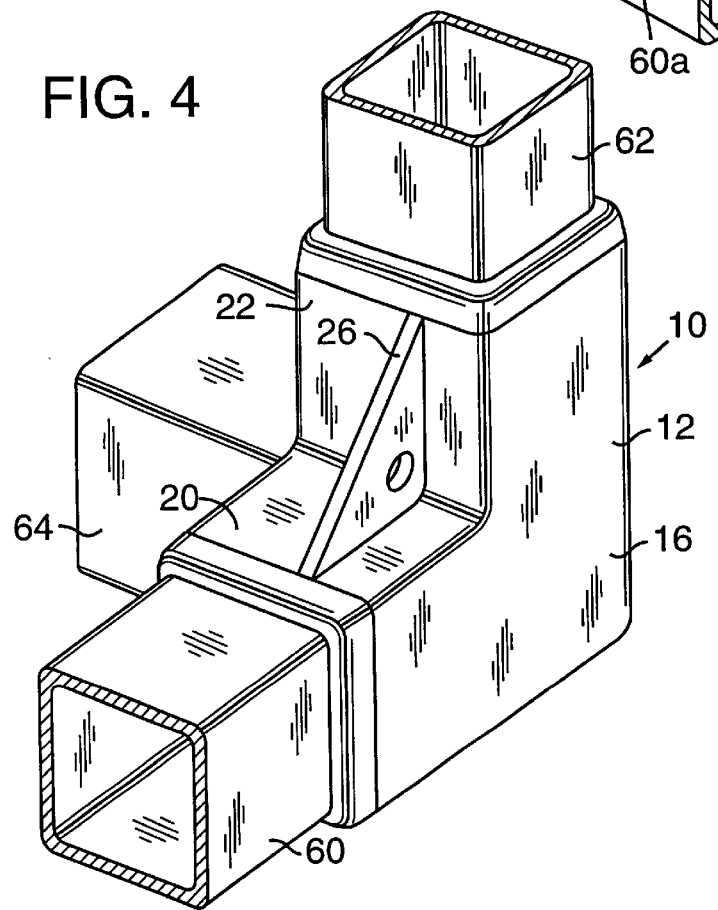
FIG. 4 is a view similar to FIG. 2 with tubes inserted into the three apertures.
Figure 5:
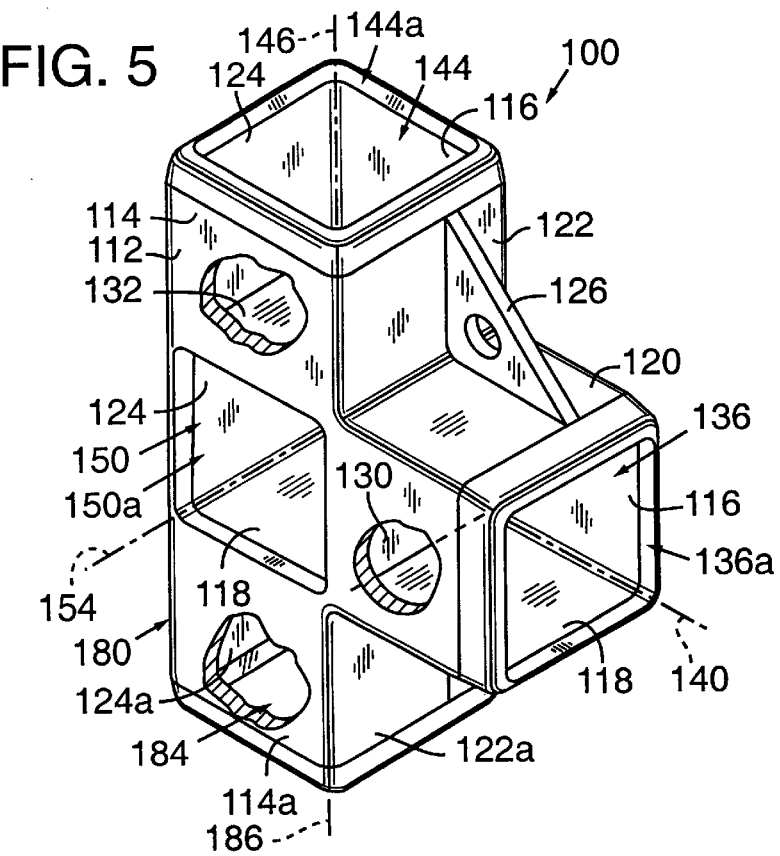
FIG. 5 is a top and side perspective view of a tubing connector according to the invention having four angularly disposed apertures with portions broken away to illustrate interior portions of the apertures.
Figure 6:
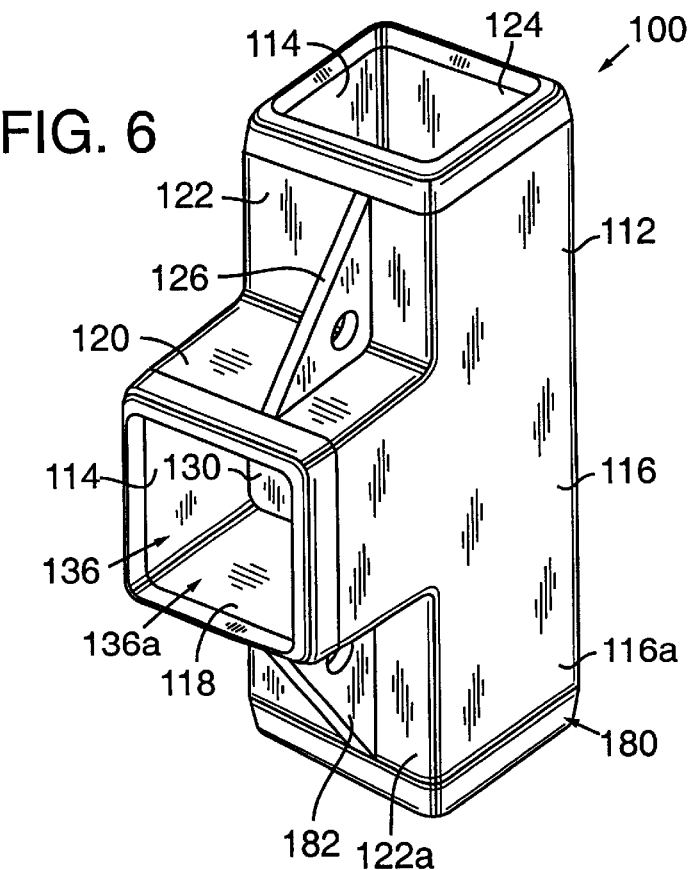
FIG. 6 is a perspective view of the connector illustrated in FIG. 5 showing the opposite side thereof.

FIGS. 3 and 4 illustrate tubing connector 10 with a plurality of substantially rigid polygonal cross-section tubes 60, 62, 64 inserted therein. The outer surfaces of tubes 60, 62 and 64 have configurations complementary to the internal configurations of apertures 36, 44 and 50 such that each tube is closely and slidably received in its associated aperture with somewhat of a friction fit therebetween. For example, side walls 60a, 60c of the tube are closely confined by walls 14, 16 of the tubing connector and walls 60b, 60d of the tube are closely confined by walls 18, 20 of the connector. An end 60e of the tube may be pressed against wall 30 in aperture 36 to limit the portion or length of the tube to be held by the connector and to provide a support against which the end of tube may rest to provide support against further longitudinal movement of the tube inwardly of the body. Explaining further, since wall 30, also referred to as a limit or stop element, inhibits further inward movement of tube 60, the tube may not extend further inwardly to interfere with the insertion of tube 64 in aperture 50. Similarly, tube 62 inserted into aperture 44 is limited by wall, or stop element, 32 to support the tube in its longitudinal insertion and to prevent it from extending into aperture 50 which would interfere with the insertion of tube 64. Tube 64 slides longitudinally into aperture 50 with its end extremity coming to rest against side wall 16 of the tubing connector.

The longitudinal axes of tubes 60, 62 and 64 are indicated by lines 70, 72, 74, respectively, and when held in the connector coincide with axes 40, 46, 54 described above for the apertures in which they are received.

The structure described provides a tubing connector adapted to receive and hold a plurality of elongate, substantially rigid tubes having polygonal cross-sectional configurations with stop walls, or elements, therein determining the depth of insertion of the tubes into the connector and providing support against longitudinal forces imposed upon the tubes directed inwardly of the body.

Another embodiment of the invention is indicated generally at 100 in FIGS. 5, 6, and 12–14. Connector 100 is similar to connector 10 previously described, with the exception that it has a fourth aperture producing protrusion indicated generally at 180.

Since the major portion of tubing connector 100 is substantially similar to that previously described, parts similar to that shown and described in regard to FIGS. 1–4 and 9–11 are given "100" series numbers with the last two digits being similar to those used in describing the component parts of the tubing connector described in regard to FIGS. 1–4 and 9–11.

Referring to the addition of protrusion 180 it will be seen that extensions of sides 114, 116 and 124 project downwardly from bottom wall 118. These downwardly projecting extension portions are denoted generally at 114a, 116a, 122a, and 124a. As seen in FIGS. 6 and 12–14, a triangular gusset, or flange, 182 which is similar to gusset, or flange, 126 extends between walls 122a, 118 for increasing rigidity of the structure.

Walls 114a, 116a, 122a, 124a produce a downwardly opening aperture 184 having a central axis indicated generally by line 186. The mouth of aperture 184 would be similar to the mouth, or opening illustrated for apertures 136, 144.

Figure 7:
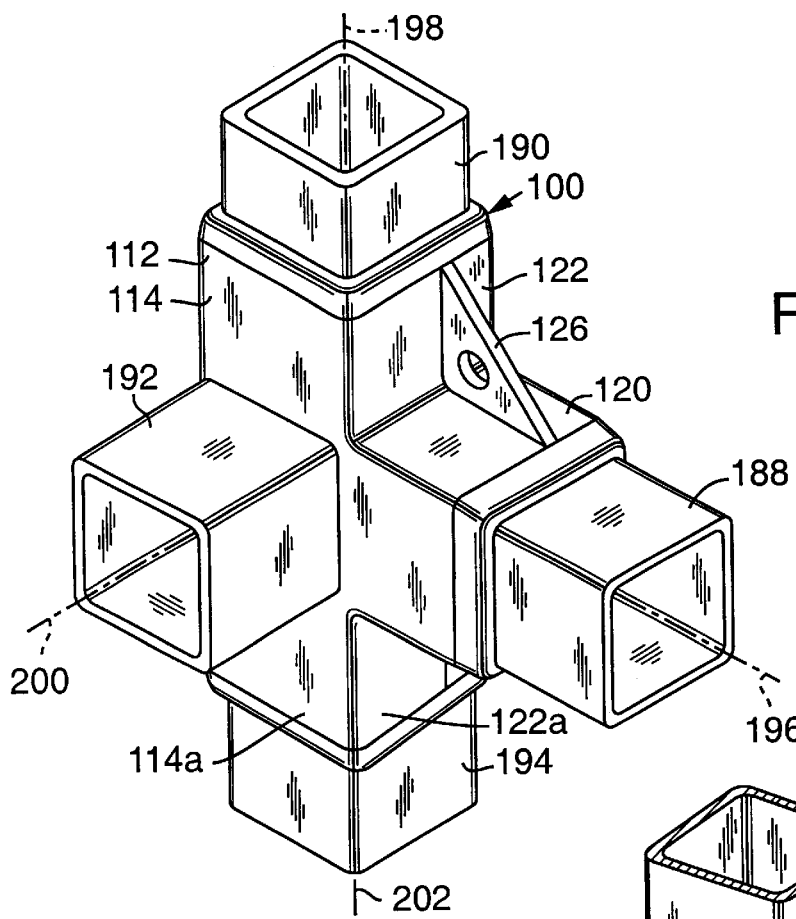
FIG. 7 is a view similar to FIG. 5, but with ends of four tubes inserted into the four apertures and extending outwardly therefrom.
Figure 8:
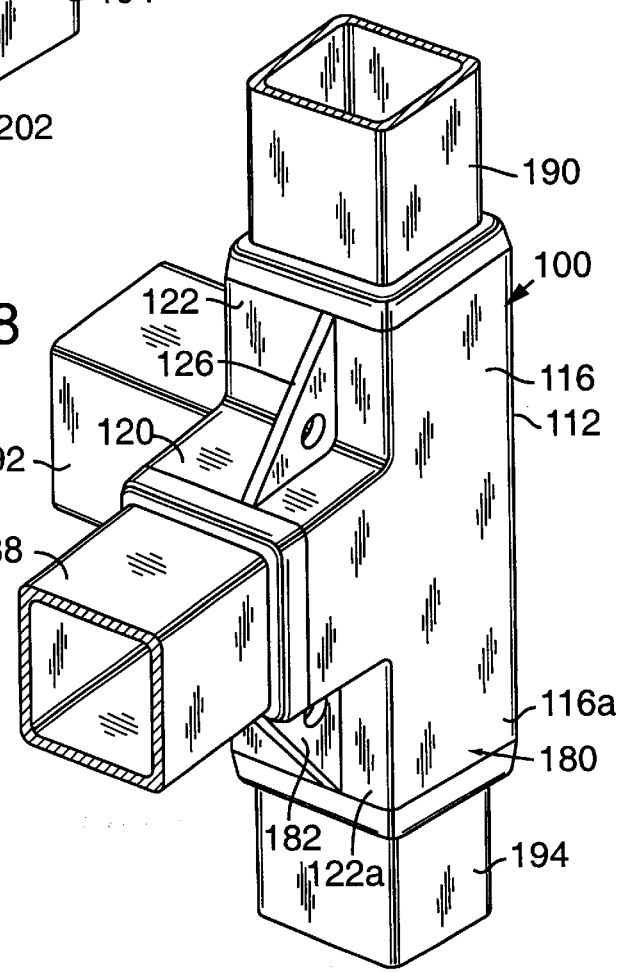
FIG. 8 is a view similar to FIG. 6 with the tubes inserted therein.

Whereas the tubing connector illustrated in FIGS. 1–4 and 9–11 was adapted to receive and hold three angularly disposed tubes, the tubing connector of FIGS. 5, 6 and 12–14 is adapted to hold four angularly disposed tubes as denoted at 188, 190, 192, 194 in apertures 136, 144, 150, 184, respectively. As illustrated in FIG. 7, the tubes 188, 190, 192, 194 are positioned with their central longitudinal axes 196, 198, 200, 202, respectively, disposed at substantial angles relative to each other. The end extremities of tubes 188, 190, 192 engage walls 130, 132, 116, respectively, and the inward movement of the tubes are limited thereby. The longitudinal inward movement of tube 194 into aperture 184 is limited by the inner end extremity of tube 194 contacting wall 118 which forms the upper interior surface of aperture 184.

The tubing connectors illustrated and described herein thus are capable of receiving and holding end portions of substantially rigid tubing having multi-angular polygonal cross-sections, with the tubing extending outwardly from the connector in angularly defined relationships. Such tubing connectors permit interconnection of tubes to provide a variety of forms of space frames which may be used for a multitude of purposes. The multi-angular polygonal configuration of the tubing connector walls which are complementary to the exterior configurations of the tubes, closely and slidably receives the tubes to hold them therein and prevents rotation of the tubes about their longitudinal axes. Further the internal walls, or stop elements, not only define the depth into which the tubes may extend into the tubing connector apertures, but also provide support against longitudinal forces imposed upon the tubes.

Although tubing connectors having three or four apertures with internal walls, or stop elements, therein have been disclosed and described herein, it should be apparent to those skilled in the art that variations and modifications are possible without departing from the spirit of the invention. For example, but not by way of limitation, tubing connectors with differing numbers of apertures and internal walls, or stop elements of different structure, or differently positioned gussets, or flanges, are possible.

What is claimed is:

1. A tubing connector adapted to receive end portions of at least three elongate substantially rigid tubes and to hold them in defined angular relationship relative to each other, the connector comprising:

a body having a central portion and protrusions that extend outwardly from said central portion, said central portion and protrusions defining a plurality of tube-receiving and holding apertures formed therein with each aperture having a tube-receiving mouth offset from other apertures in the body through which a tube may be inserted into an aperture in said body, said body comprising a pair of laterally spaced side members which define side walls for apertures in said protrusions, and an aperture in the central portion extends between said spaced side members with said tube-receiving and holding apertures occupying a common plane, and stop elements in said apertures in the protrusions spaced inwardly of the body from the mouth of its associated aperture to limit the extent to which an end portion of a tube may be inserted longitudinally into said body.

2. The connector of claim 1, wherein a stop member comprises an element secured at a selected location spaced inwardly on the body from the aperture mouth and extending between said side members.

3. The connector of claim 1, wherein each of said plural apertures has a central axis which is angularly disposed relative to the central axes of the other apertures.

4. The connector of claim 1, wherein one of said stop elements in a protrusion is positioned in an aperture in said protrusion to prevent a portion of a tube inserted in said aperture from projecting into the aperture in the central portion.

5. The connector of claim 4, wherein said one stop element comprises a wall extending between said side members and positioned between adjacent apertures to engage and limit insertion of a tube.

6. The connector of claim 1, wherein said body is monolithic and an aperture comprises a tunnel-like openings extending inwardly of the body from its tube-receiving mouth.

7. The connector of claim 1, wherein an aperture has a polygonal cross section.

8. The connector of claim 1, wherein the aperture in the central portion is disposed between the apertures in said protrusions.

9. The connector of claim 1, wherein the aperture in the central portion has a mouth formed in one of said side members and said aperture in said central portion is disposed between the apertures in said protrusions.

10. A tubing connector adapted to receive end portions of at least three elongate substantially rigid tubes and to hold them in defined angular relationship relative to each other, the connector comprising:

a body having a central portion and protrusions that extend outwardly from said central portion, said central portion and protrusions defining a plurality of tube-receiving and holding apertures formed therein with each aperture having a tube-receiving mouth offset from other apertures in the body through which a tube may be inserted into an aperture in said body, said body comprising a pair of laterally spaced side members which define side walls for apertures in said protrusions, and an aperture in the central portion extends between said spaced side members with said tube-receiving and holding apertures occupying a common plane, wherein each of said plural apertures has a central axis which is angularly disposed relative to the central axes of the other apertures, and stop elements in said apertures spaced inwardly of the body from the mouth of its associated aperture to limit the extent to which an end portion of a tube may be inserted longitudinally into said body.

11. The connector of claim 10, wherein a stop member comprises an element secured at a selected location spaced inwardly on the body from the aperture mouth and extending between said side members.

12. The connector of claim 10, wherein one of said stop elements in a protrusion is positioned in an aperture in said protrusion to prevent a portion of a tube inserted in said aperture from projecting into the aperture in the central portion.

13. The connector of claim 12, wherein said one stop element comprises a wall extending between said side members and positioned between adjacent apertures to engage and limit insertion of a tube.

14. The connector of claim 10, wherein said body is monolithic and an aperture comprises a tunnel-like opening extending inwardly of the body from its tube-receiving mouth.

15. The connector of claim 8, which further comprises a gusset extending between at least two of said protrusions.

16. The connector of claim 15, wherein a protrusion has a pair of sidewalls disposed in spaced-apart planes and said gusset is disposed intermediate said planes.

17. The connector of claim 16, wherein said gusset is disposed closer to one of said planes than the other.

18. The connector of claim 10, wherein an aperture has a polygonal cross section.

19. The connector of claim 10, wherein the aperture in the central portion is disposed between the apertures in said protrusions.

20. The connector of claim 10, wherein the aperture in the central portion has a mouth formed in one of said side members and said aperture in said central portion is disposed between the apertures in said protrusions.

* * * * *